(12) United States Patent
Iturgoyen Sabando et al.

(10) Patent No.: US 7,469,937 B2
(45) Date of Patent: Dec. 30, 2008

(54) QUICK CONNECTING DEVICE FOR DUCTS IN MOTOR VEHICLES

(75) Inventors: Lucio Alfredo Iturgoyen Sabando, Molins de Rei (ES); Sergio Esteve Gari, Molins de Rei (ES); Isaac Tejero Salinero, Molins de Rei (ES)

(73) Assignee: Manufactura Moderna De Metales, S.A., Barcelona (ES)

( * ) Notice: Subject to any disclaimer, the term of this patent is extended or adjusted under 35 U.S.C. 154(b) by 93 days.

(21) Appl. No.: 10/540,931

(22) PCT Filed: May 5, 2004

(86) PCT No.: PCT/ES2004/000199

§ 371 (c)(1),
(2), (4) Date: Jun. 29, 2005

(87) PCT Pub. No.: WO2005/090849

PCT Pub. Date: Sep. 29, 2005

(65) Prior Publication Data

US 2006/0061095 A1    Mar. 23, 2006

(30) Foreign Application Priority Data

Mar. 9, 2004   (ES) .............................. 200400572

(51) Int. Cl.
*F16L 37/00* (2006.01)
(52) U.S. Cl. ................... 285/305; 285/319; 285/337; 285/364; 285/921
(58) Field of Classification Search .................. 285/319, 285/337, 334.5, 351, 364, 406, 420, 903, 285/305, 921; 24/27
See application file for complete search history.

(56) References Cited

U.S. PATENT DOCUMENTS

| | | | | |
|---|---|---|---|---|
| 464,338 A | * | 12/1891 | Crisp | 24/27 |
| 4,707,000 A | * | 11/1987 | Torgardh | 285/305 |
| 4,756,558 A | * | 7/1988 | Beamer | 285/39 |
| 5,275,443 A | * | 1/1994 | Klinger | 285/82 |
| 5,882,048 A | * | 3/1999 | Kawasaki et al. | 285/319 |
| 6,102,447 A | * | 8/2000 | Aldridge | 285/305 |
| 6,250,691 B1 | | 6/2001 | Taylor et al. | |
| 2001/0019209 A1 | | 9/2001 | Larsson et al. | |
| 2002/0195820 A1 | | 12/2002 | Surjaatmadja | |

FOREIGN PATENT DOCUMENTS

| | | |
|---|---|---|
| FR | 1.419.014 | 10/1964 |
| FR | 2592702 | 12/1986 |
| WO | WO 03/104699 A2 | 12/2003 |

* cited by examiner

*Primary Examiner*—Aaron M Dunwoody
*Assistant Examiner*—Fannie Kee
(74) *Attorney, Agent, or Firm*—Blank Rome LLP

(57) ABSTRACT

It allows quick and effective coupling of a first duct end (female member) and a second duct end (male member). The male member includes an outer circumferential groove and the female member has two outer protrusions defining respective inner recesses adapted for receiving sealing and locking gaskets. When assembled, the female member extends to the male member without covering the circumferential groove thereof. A fastening clip is provided fitted into the groove of the male member and also into the groove defined between the protrusions of the female member, holding them axially in place.

9 Claims, 4 Drawing Sheets

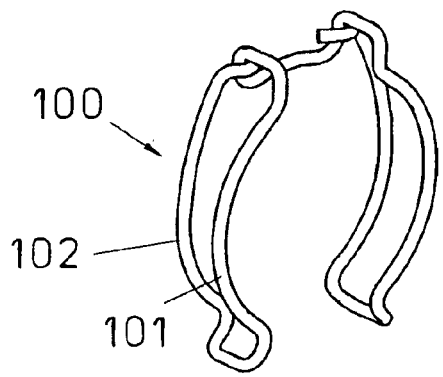
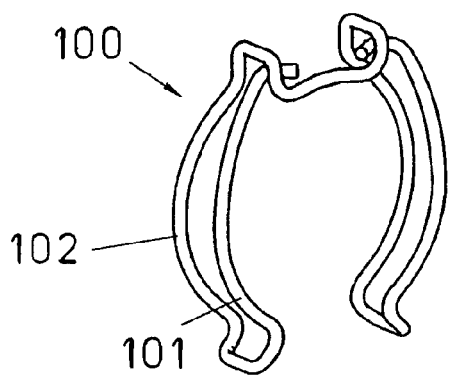
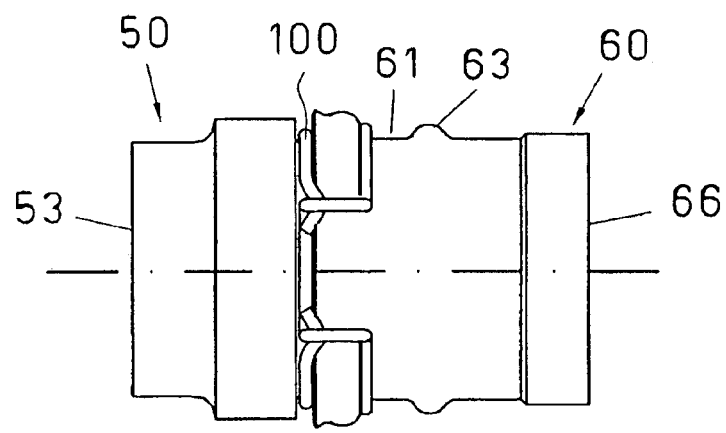
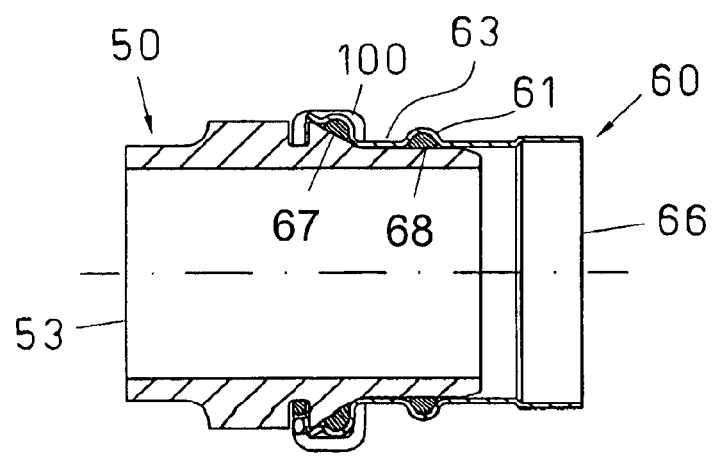

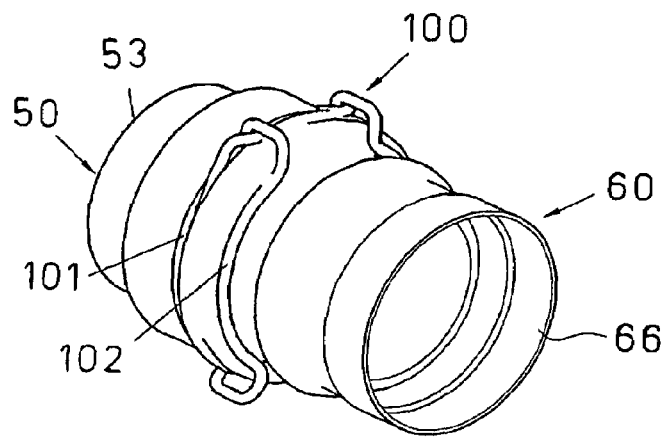
FIG.9
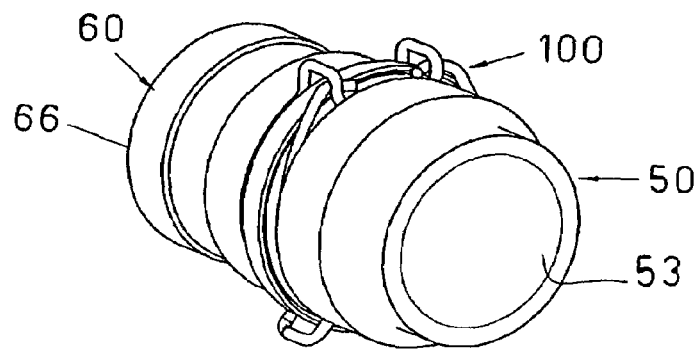
FIG.10
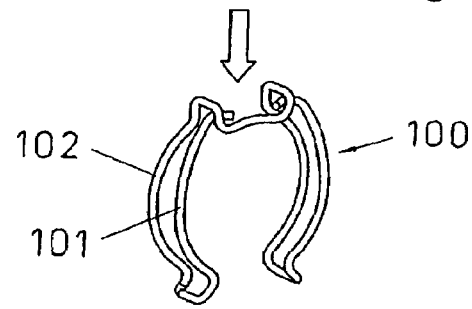
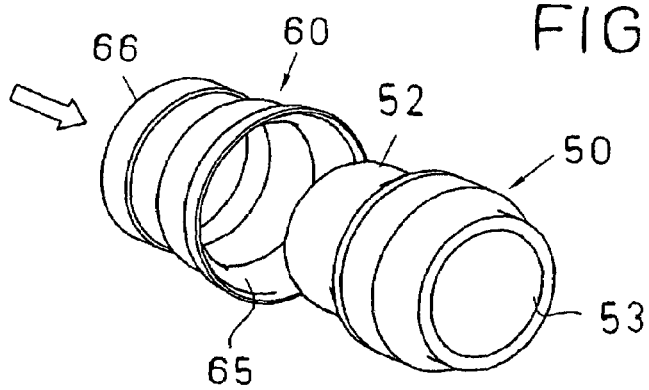
FIG.11

QUICK CONNECTING DEVICE FOR DUCTS IN MOTOR VEHICLES

FIELD OF THE INVENTION

The present application for a Patent of Invention refers to a quick connecting device for ducts in motor vehicles which novel manufacturing, conformation and design features fulfil the purpose to which it has been specifically conceived, with a maximum safety and effectiveness and with many advantages, as will be fully disclosed hereinafter in the present specification.

More particularly, there is provided a quick connecting device for ducts in motor vehicles which is intended for the quick connection of a first duct end to a second duct end. The quick connecting device of the invention is intended particularly, but not exclusively, to connect the air cooling duct to the turbo outlet duct of the motor vehicle engine.

BACKGROUND OF THE INVENTION

Standardization in the turbo outlet duct end of the engine (second duct hereinafter) on the part of each manufacturer makes it necessary to design a quick connecting device particularly and accurately adapted to manufacturing requirements. As a general rule, the second duct, particularly sized according to each manufacturer, is provided with a coupling end (referred herein to as male member) wherein said air cooling duct is to be coupled (first duct hereinafter) through a quick connecting device. Said coupling end of the above mentioned second duct is adapted for snugly receiving a fastening clip which purpose is to hold in place the first and the second ducts through said quick connecting device.

Quick connecting devices currently being manufactured for this purpose are formed basically of a female bush-like tubular body associated with said first duct, that is, with the air cooling duct coming out from the turbo of the motor vehicle engine. The inner surface of said female bush is suitably adapted to fit the outer surface of said second duct end (that is to say, the male member). Said male member has a peripheral groove where a sealing o-ring is received.

When assembled, the first duct end (female member) is attached to said tubular body (male member) that is fitted therein so that the female member covers said circumferential groove of the male member.

The female member, that is, the first duct end, has typically a groove complementary to the groove of the male member to allow coupling of the fastening clip.

Although the design of these coupling devices is advantageous in the sense that an easy and comfortable coupling in assembly, maintenance and repair operations of the ducts being connected is achieved, however it has been found in practice that the working conditions that the connecting device is subjected (high temperatures and vibrations) result in many connecting faults. In particular, it has been found that the female member is usually broken since, as stated before, vibrations to which it is subjected in conjunction with the high temperatures to which it is also subjected result in expansion of the circumferential groove thus forming a crack leading to fatigue cracking of the coupling end of the cooling duct (first duct). This problem has forced users using said connecting system to take their motor vehicles for repairing so that said quick connecting device is duly replaced for a new one.

Later attempts have been carried out for overcoming these problems. One of the proposed solutions at present for reducing the possibilities of breakage of the connecting device consists, for example, in increasing the wall thickness in the connecting area, specially in the connecting area where the circumferential groove of the female member is formed, that is the area where the breakage of the device begins. However, machining difficulties for obtaining the final piece with this increased thickness at a given area and the increase of material required result in a considerably increased cost of said device.

SUMMARY OF THE INVENTION

The invention provides a new quick connecting device such that overcoming said disadvantages is made possible, keeping the advantages of the quick connection of the first and the second ducts.

Therefore, the quick connecting device of the present invention does not use the previously described configuration in connection with the prior art and it has a novel configuration, which is perfectly adapted to the standards provided by the manufacturer regarding the second duct end (male member) (engine turbo outlet).

The quick connecting device of the invention comprises a bush-like body (female member) associated with a first duct. The term "associated" as used herein means that the female member may be either coupled by any suitable means to said first duct or it may be integral thereto.

The inner surface of said bush or female member is adapted for receiving a second duct end (male member). This male member, associated with the second duct, has a circumferential groove on the outer surface thereof. When assembled, the female member, that is to say, the first duct end, extends to the male member but without covering said circumferential groove thereof.

The surface of the female member end is provided with two outer protrusions forming respective inner recesses adapted for receiving sealing gaskets. This double-inner recess configuration of the female member allows arranging a first sealing gasket and a second locking gasket between the male member and the female member to ensure a tighter and more effective connection.

Causes of breakage of the connecting device are therefore eliminated by the invention by successfully eliminating connection faults between the ducts.

Axial retention of the male member regarding the female member is carried out by means of a fastening clip comprising substantially two U-shaped coupling members. One of said coupling members is fitted into the outer circumferential groove of the bush while the other is fitted into the outer groove defined between said protrusions in said female member end.

A very effective quick connecting device with a long working useful life is therefore obtained, thus withstanding well the working conditions in the motor vehicle engine, with a very reduced cost.

BRIEF DESCRIPTION OF THE DRAWINGS

The features and the advantages of the present invention will be clearer from the description of a preferred embodiment than will be given by way of a non limitative example. This description is given hereinafter in connection with the drawings, in which:

FIGS. 5 and 6 are perspective views showing the fastening clip as seen from the front and the back, respectively;

FIG. 7 is an elevational view showing the male member fitted into the female member of the first duct;

FIG. 8 is an elevational view of a longitudinal cross-section of the assembly in FIG. 7 shown in its assembled condition;

FIGS. 9 and 10 are perspective views showing the assembly in FIG. 7 in its assembled condition as seen from the front and the back, respectively; and FIG. 11 is a perspective view in which the different parts forming the quick connecting device for ducts in motor vehicles of the invention are shown in its disassembled condition to see the assembly sequence thereof.

DETAILED DESCRIPTION OF THE INVENTION

Figure 1:
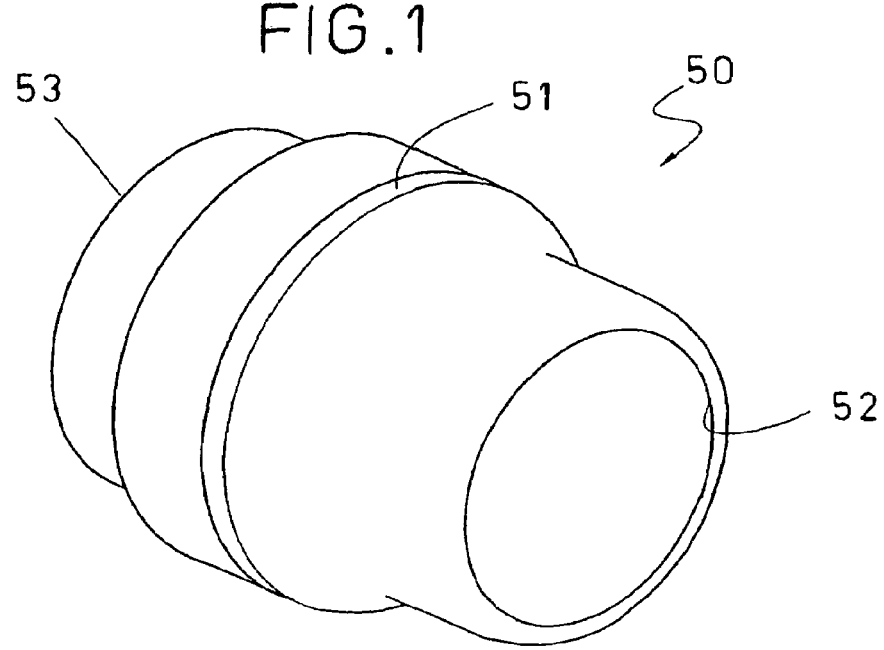
FIG. 1 is a perspective view of the male bush associated with the second duct.
Figure 2:
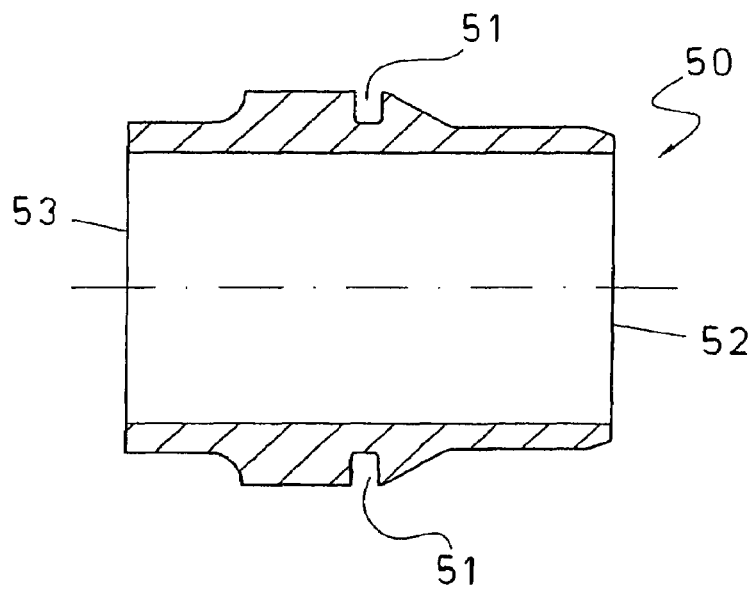
FIG. 2 is a cutaway elevational view of the male member in FIG. 1.
Figure 3:
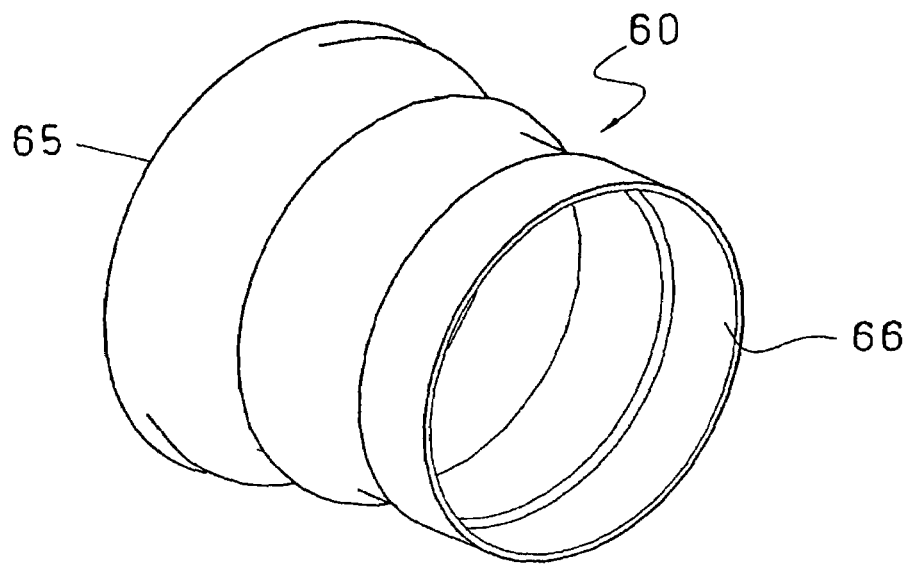
FIG. 3 is a perspective view of the female member associated with the first duct.

According to the figures attached in the present specification, an example of a quick connecting device according to the present invention is now described. In the specific example shown in the figures, the device is intended for connecting the cooling air duct (first duct) to the turbo outlet duct of the motor vehicle engine (second duct). Both ducts have not been shown since they are not the object of the invention.

The first and the second ducts are coupled to each other and they are not allowed of being axially displaced, said coupling being tight because of the device of the invention, which will be fully described below.

The device of the invention basically comprises a bush-like body (60) (female member hereinafter) adapted for receiving a second duct end (50) (male member hereinafter) therein.

This female member (60) has one end (65) for coupling with the male member (50) and one end (66) for connection with the first duct. This connection with the first duct may be carried out either by any conventional means or it may be integral thereto.

Figure 4:
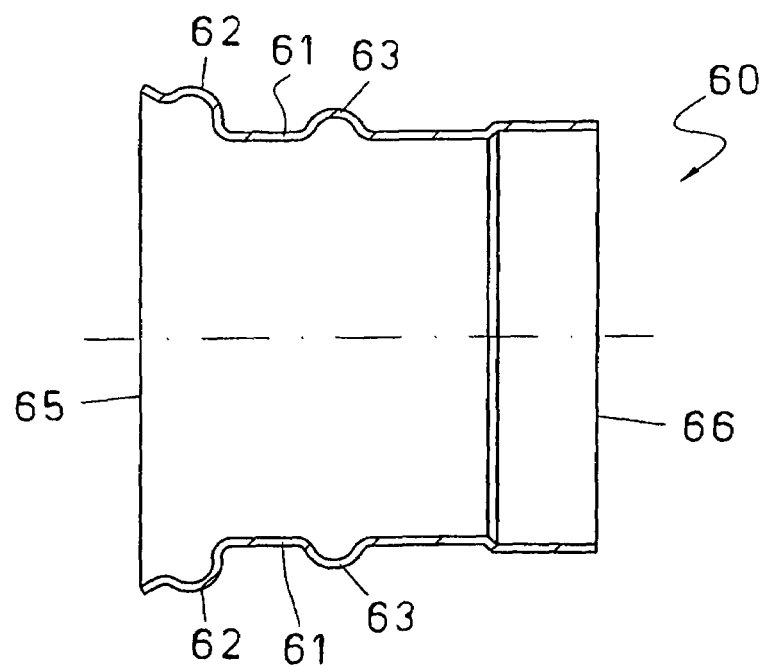
FIG. 4 is a cutaway elevational view of the female member of the first duct in FIG. 3.

The female member (60) is provided, in the outer surface thereof, with a circumferential groove (61) defined by two outer parallel protrusions (62, 63), as it can be seen from the view of FIG. 4. These parallel protrusions (62, 63) are capable of receiving respective gaskets (67, 68) therein, as shown in FIG. 8. Therefore, by providing two gaskets (67, 68), one acts as a sealing gasket and the other one acts as a locking gasket, thus ensuring a tight and effective connection.

The device is adapted for snugly receiving a fastening clip referenced by (100) which configuration can be seen from FIGS. 5 and 6 of the drawings herein attached.

The male member (50) has one end (52) for connection with the female member (60), through its respective connection end (65) and one end (53) for connection with the second duct, that is to say, the turbo outlet duct of the motor vehicle engine. The male member (50) is further provided, on the outer surface thereof, with a circumferential groove (51) adapted for receiving said fastening clip (100).

From its assembled condition shown in FIGS. 7 to 10 of the drawings, it may be seen how the female member (60) extends to the outside of the male member (50) without covering said circumferential groove (51) of the male member (50), as opposed to prior art devices. This particularity is clearly shown in the cutaway view in FIG. 8, in which it may be seen that the end portion of the female member (60) does not cover the circumferential groove (51) of the male member (50). The purpose of such design is eliminating the possibilities of breakage of the female member (60) and thus ensuring the connection between the ducts.

As it can be seen from FIGS. 5 and 6, the fastening clip (100) comprises a single member suitably shaped to define two substantially U-shaped coupling members (101, 102). One of said coupling members (101) is adapted to be fitted into the circumferential groove (51) of the male member (50) while the other coupling member (102) is adapted to be fitted into the outer groove (61) defined between said protrusions (62, 63) of the female member (60) of the first duct, as it can be seen from FIG. 4.

The device of the invention is shown in its assembled condition in FIG. 10, and in the exploded view of FIG. 11 it is shown in its disassembled condition. Said FIG. 11 shows how the male member (50) has to be fitted into the female member (60) for subsequently assembling the fastening clip (100), the assembly being as shown in FIGS. 7, 8 and 9.

The invention claimed is:

1. A quick connecting device for ducts in motor vehicles, comprising of:

a female member having first and second opposite ends, and an outer surface with first and second circumferential protrusions;

a male member having first and second opposite ends, and an outer surface with a circumferential groove, said male member being receivable in said female member at said first end of said female member without said first end of said female member covering said circumferential groove;

first and second sealing members disposed between said first and second circumferential protrusions, respectively, of said female member and said outer surface of said male member; and a fastening member disposed around said female and male members so as to be in direct contact with the first circumferential protrusion of said female member and received in the groove of said male member in a manner that compresses the first sealing member, the fastening member thereby holding said female and male members axially in place.

2. A quick connecting device according to claim 1, wherein said fastening member includes first and second substantially U-shaped coupling portions, one of said first and second coupling portions being received in said circumferential groove of said male member and the other of said coupling portions being fitted into the groove defined between the first and the second circumferential protrusions of the female member.

3. A quick connecting device according to claim 1, wherein said first and second sealing members are first and second gaskets, respectively.

4. A quick connecting device according to claim 1, wherein said fastening member is a fastening clip.

5. A quick connecting device for ducts in motor vehicles, comprising of:

a female member having first and second opposite ends, and an outer surface with first and second circumferential protrusions;

a male member having first and second opposite ends and an outer surface with a circumferential groove and an inclined surface, said male member being receivable in said female member at said first end of said female member with first and second sealing members respectively disposed between said first and second protrusions of said female member and said outer surface of said male member, and said male member being receivable in said female member at said first end of said female member without said first end of said female member covering said circumferential groove;

said first sealing member being located on said inclined surface; and a fastening member disposed around said female and male members so as to be in contact with the first circumferential protrusion of said female member and received in the groove of said male member in a manner that compresses the first sealing member, the fastening member thereby holding said female and male members axially in place.

6. A quick connecting device according to claim 5, wherein said fastening member includes first and second substantially U-shaped coupling portions, one of said first and second coupling portions being received in said circumferential groove of said male member and the other of said coupling portions being fitted into the groove defined between the first and the second circumferential protrusions of the female member.

7. A quick connecting device according to claim 5, wherein said first and second sealing members are first and second gaskets, respectively.

8. A quick connecting device according to claim 5, wherein said fastening member is a fastening clip.

9. A quick connecting device according to claim 5, wherein said first circumferential protrusion is of a larger diameter wound the said female member than said second circumferential protrusion.

* * * * *